(12) United States Patent
Hu et al.

(10) Patent No.: US 12,181,775 B2
(45) Date of Patent: Dec. 31, 2024

(54) OPTICAL ELEMENT DRIVING MECHANISM

(71) Applicant: TDK TAIWAN CORP., Taoyuan (TW)

(72) Inventors: Chin-Ming Hu, Taoyuan (TW);
Sheng-Zong Chen, Taoyuan (TW);
Shou-Jen Liu, Taoyuan (TW);
Yung-Ping Yang, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 63 days.

(21) Appl. No.: 17/983,232

(22) Filed: Nov. 8, 2022

(65) Prior Publication Data
US 2023/0060473 A1    Mar. 2, 2023

Related U.S. Application Data

(63) Continuation of application No. 16/589,667, filed on Oct. 1, 2019, now Pat. No. 11,531,182.
(Continued)

(30) Foreign Application Priority Data

Jul. 31, 2019  (CN) .......................... 201910701145.7

(51) Int. Cl.
*G02B 7/08*        (2021.01)
*G03B 3/10*        (2021.01)
(Continued)

(52) U.S. Cl.
CPC ............... *G03B 13/34* (2013.01); *G03B 3/10* (2013.01); *G02B 7/04* (2013.01); *G02B 7/08* (2013.01)

(58) Field of Classification Search
CPC . G03B 13/34; G03B 3/10; G02B 7/04; G02B 7/08; H04N 23/51; H04N 23/54; H04N 23/55
See application file for complete search history.

(56) References Cited

U.S. PATENT DOCUMENTS 11,927,875 B2 *  3/2024  Sugawara ............ G02B 27/646
12,032,224 B2 *  7/2024  Lin ........................... G02B 7/09
(Continued)

FOREIGN PATENT DOCUMENTS

CN      102012551 A    4/2011
CN      211123432 U    7/2020

OTHER PUBLICATIONS

An Office Action in corresponding CN Application No. 201910701145.7 mailed May 31, 2022, 7 pages.

*Primary Examiner* — George G. King
*Assistant Examiner* — Anna Smith (57) ABSTRACT

An optical element driving mechanism is provided. The optical element driving mechanism includes a fixed part, a movable part, and a driving assembly. The fixed part includes a bottom. The movable part is movable relative to the fixed part. The movable part holds an optical element with an optical axis. The driving assembly drives the movable part to move relative to the fixed part. The bottom includes a base and an embedded assembly. The embedded assembly is partially embedded in the base. The embedded assembly includes a magnetic-permeable material.

22 Claims, 11 Drawing Sheets

Related U.S. Application Data (60) Provisional application No. 62/741,825, filed on Oct. 5, 2018.

(51) Int. Cl.
  *G03B 13/34*  (2021.01)
  *G02B 7/04*   (2021.01)

(56) References Cited

U.S. PATENT DOCUMENTS

| | | | |
|---|---|---|---|
| 2008/0079845 A1 | 4/2008 | Osaka et al. | |
| 2008/0259467 A1 | 10/2008 | Chung | |
| 2008/0266682 A1 | 10/2008 | Ishizawa et al. | |
| 2011/0058268 A1 | 3/2011 | Kokichi | |
| 2013/0050828 A1* | 2/2013 | Sato | H04N 23/54 |
| | | | 359/557 |
| 2015/0103195 A1* | 4/2015 | Kwon | H04N 23/54 |
| | | | 348/208.12 |
| 2016/0025995 A1* | 1/2016 | Ariji | G03B 5/02 |
| | | | 359/557 |
| 2024/0223876 A1* | 7/2024 | Sugiura | G02B 7/023 |

\* cited by examiner

OPTICAL ELEMENT DRIVING MECHANISM

CROSS-REFERENCE TO RELATED APPLICATIONS

The present application is a Continuation of U.S. patent application Ser. No. 16/589,667, filed on Oct. 1, 2019, which claims priority to U.S. Provisional Patent Application No. 62/741,825, filed on Oct. 5, 2018, and C.N. Patent Application No. 201910701145.7, filed on Jul. 31, 2019, which are incorporated by reference herein in their entirety.

BACKGROUND OF THE DISCLOSURE

Field of the Disclosure

The present disclosure relates to a driving mechanism, and more particularly to an optical element driving mechanism.

Description of the Related Art

As technology has developed, many electronic devices (such as tablet computers and smartphones) may be used to capture images and record videos. A user may take a variety of images or videos with an electronic device equipped with an optical element and an optical element driving mechanism.

There has been a trend across the electronic device industry to be thinner. That is, an optical element driving mechanism disposed in an electronic device has to be thinner as well. However, it's important to take the structural strength of an optical element driving mechanism into account when it is getting thinner.

BRIEF SUMMARY OF THE DISCLOSURE

According to some embodiments of the disclosure, an optical element driving mechanism is provided. The optical element driving mechanism includes a fixed part, a movable part, and a driving assembly. The fixed part includes a bottom. The movable part moves relative to the fixed part and holds an optical element with an optical axis. The driving assembly drives the movable part to move relative to the fixed part. The bottom includes a base and an embedded assembly. A portion of the embedded assembly is embedded in the base. The embedded assembly includes a circuit member and a strengthening frame with a plate structure. The strengthening frame includes a perforation. The optical axis passes through the perforation.

According to some embodiments of the disclosure, the strengthening frame and the circuit member are not electrically connected. The embedded assembly is made of metal or a magnetic-permeable material. The strengthening frame includes a closed structure, and the closed structure surrounds the optical axis. The strengthening frame further includes a first protrusion extending from a direction that is away from the optical axis. The strengthening frame further includes a second protrusion extending from a direction that is away from the optical axis, and when viewed along the optical axis, an area of the first protrusion is different from an area of the second protrusion. The optical element driving mechanism further includes a case connected to the first protrusion by welding or fusion. When viewed along the optical axis, the area of the first protrusion is greater than the area of the second protrusion. The base further includes a pillar, the strengthening frame further includes a third protrusion, and the third protrusion includes a bending portion disposed in the pillar. The strengthening frame further includes a plurality of first protrusions that are rotationally symmetric. The driving assembly further includes a magnetic element disposed on the case. When viewed along the optical axis, the magnetic element partially overlaps the embedded assembly.

According to some embodiments of the disclosure, an optical element driving mechanism is provided. The optical element driving mechanism includes a fixed part, a movable part, and a driving assembly. The movable part moves relative to the fixed part and holds an optical element with an optical axis. The driving assembly drives the movable part to move relative to the fixed part. The movable part further includes an elastic element and an electrical connection element. The elastic element includes an electrical connection portion and a notch. The electrical connection portion includes an arc. The electrical connection element is disposed on the electrical connection portion, and the electrical connection element is inspected from the notch.

According to some embodiments of the disclosure, the arc is greater than 180 degrees. The electrical connection element includes a curved surface corresponding to the arc. The driving assembly further includes an electrical contact spaced a distance apart from the electrical connection portion, and a portion of the electrical connection element is located between the electrical contact and the electrical connection portion. The elastic element further includes a through hole near the electrical connection portion. The elastic element further includes a deformation portion with a first segment and a second segment. When viewed along the optical axis, the width of the first segment is greater than the width of the second segment. The elastic element is disposed at the bottom and near the pillar, and the elastic element further includes an opening facing the pillar. The optical element driving mechanism further includes an adhesive element disposed in the opening. The opening and the pillar are connected via the adhesive element. The optical element driving mechanism further includes an adhesive material that is a non-conductive material, and the adhesive material is disposed on the electrical connection element. The driving assembly further includes an electrical contact, and the adhesive material is disposed on the electrical contact.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, such that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of this disclosure are described with the drawings.

Figure 1:
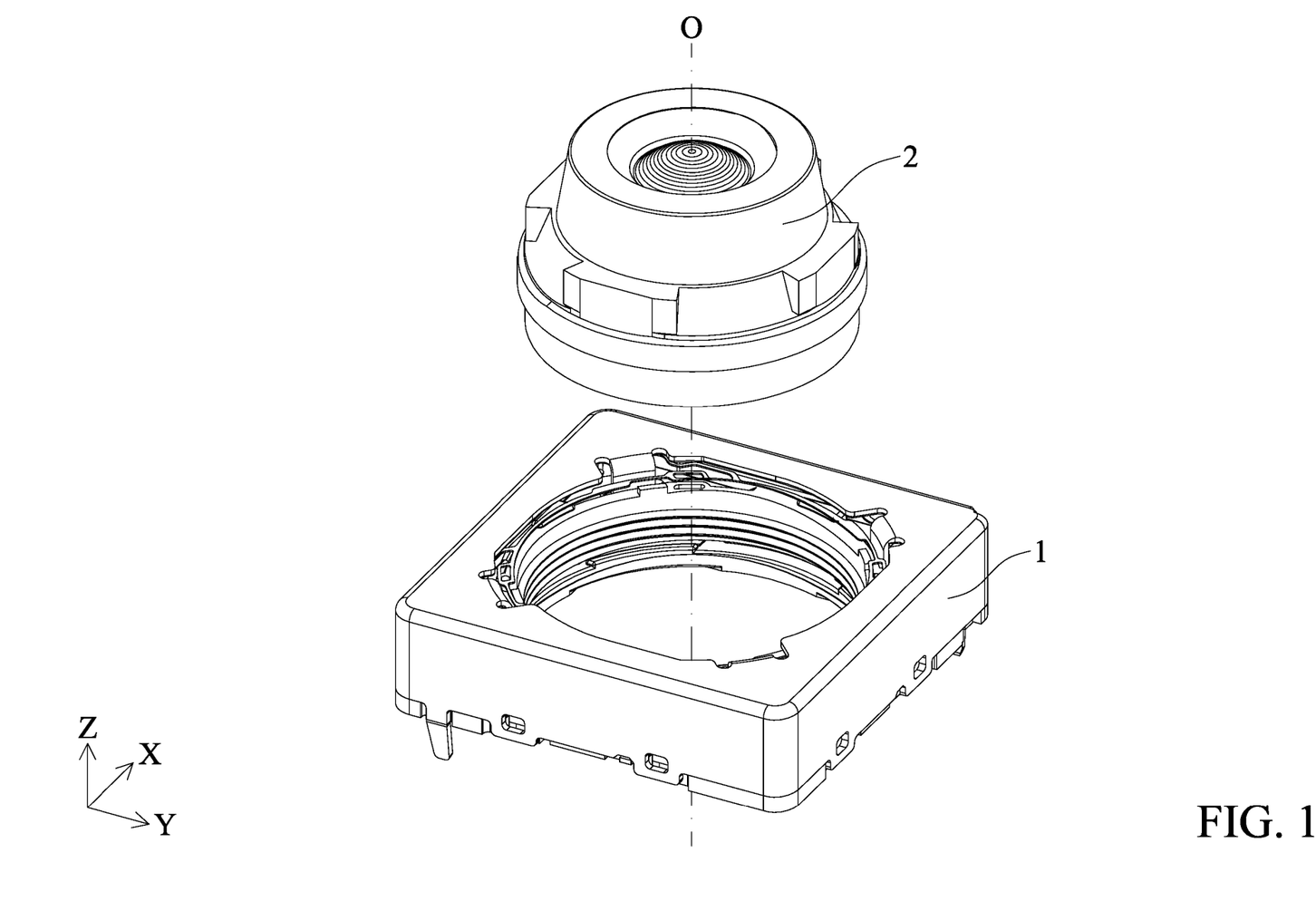
FIG. 1 is a perspective view of an optical element driving mechanism and an optical element in accordance with some embodiments of this disclosure.
Figure 2:
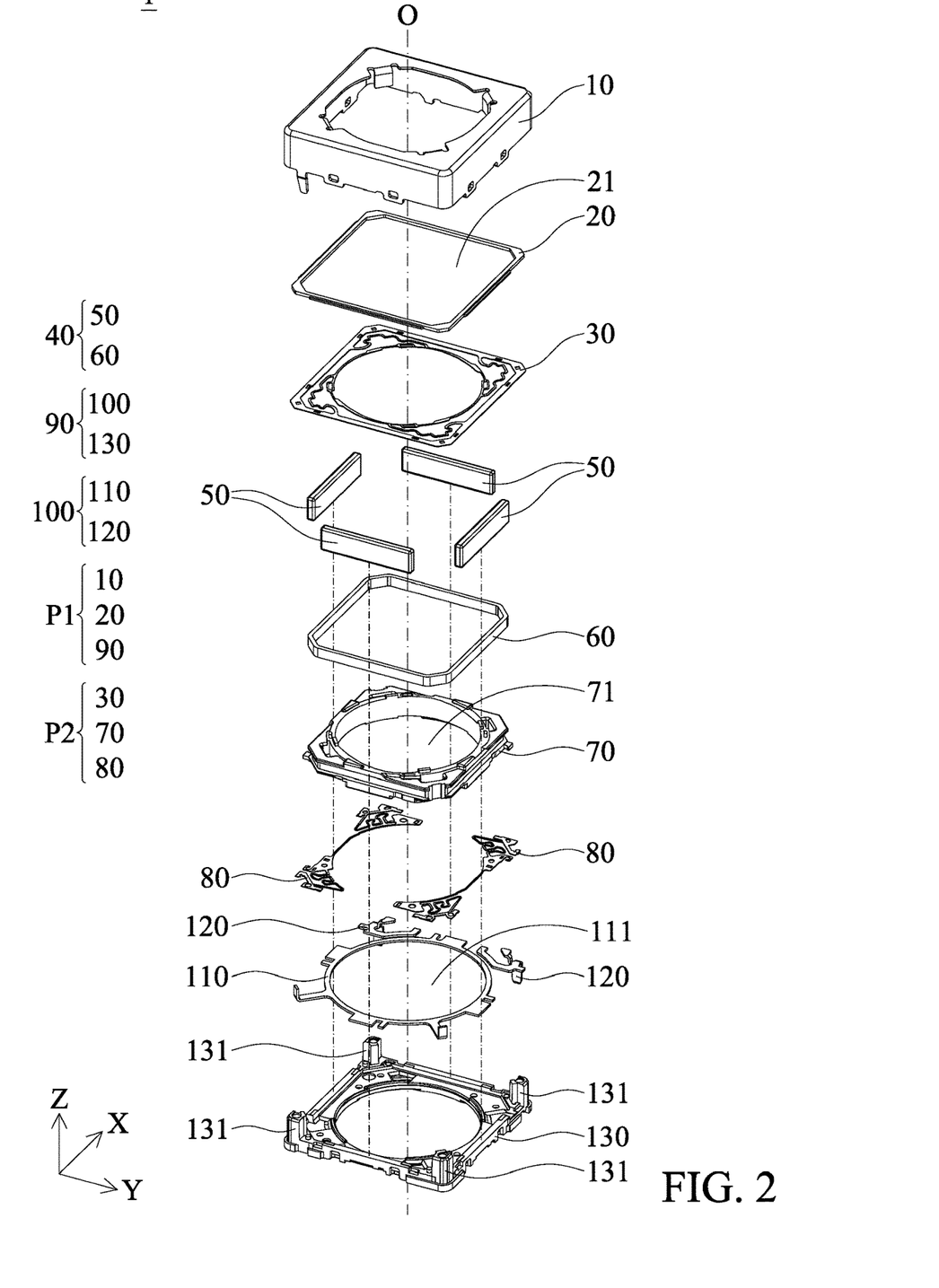
FIG. 2 is an exploded view of the optical element driving mechanism in FIG. 1.

FIG. 1 is a perspective view of an optical element driving mechanism 1 and an optical element 2 in accordance with some embodiments of this disclosure. FIG. 2 is an exploded view of the optical element driving mechanism 1 in FIG. 1. The optical element driving mechanism 1 includes a fixed part P1, a movable part P2, and a driving assembly 40. The movable part P2 moves relative to the fixed part P1 and holds the optical element 2 with an optical axis O. The optical axis O is an imaginary axis passing through the center of the optical element 2. The driving assembly 40 drives the movable part P2 to move relative to the fixed part P1.

It should be noted that, when the optical element driving mechanism 1, the optical element 2, and a photosensitive element (not shown) (such as a charge-coupled detector, CCD) are aligned, the optical axis O of the optical element 2 also passes through the center of the optical element driving mechanism 1. In some drawings that the optical element 2 is not shown, the optical axis O is still shown for the purpose of describing the features of the optical element driving mechanism 1.

In this embodiment, the fixed part P1 includes a case 10, a frame 20, and a bottom 90. The movable part P2 includes a first elastic element 30, a holder 70, and two elastic elements 80. The driving assembly 40 includes four magnetic elements 50 and coil 60. The elements of the optical element driving mechanism 1 may be added or omitted depending on requirements of the users.

The case 10, the frame 20, and the bottom 90 of the fixed part P1 are sequentially arranged along the optical axis O. The case 10 may be made of metal. The frame 20 has a central opening 21. The case 10 is located above the frame 20 and the bottom 90. The case 10 is connected to the bottom 90. The methods for connecting the case 10 and the bottom 90 may be engagement, fusion, welding, etc. Other elements of the optical element driving mechanism 1, such as the movable part P2 and the driving assembly 40, may be accommodated in a space formed by the combination of the case 10 and the bottom 90. For example, the holder 70 may be held resiliently by the first elastic element 30 and the second elastic elements 80, so the holder 70 is movably disposed in the central opening 21 of the frame 20.

A hollow 71 is within the holder 70 to hold the optical element 2. A screw and corresponding threaded structure may be configured between the hollow 71 and the optical element 2, so that the optical element 2 may be fixed in the holder 70 better.

The holder 70 is not in direct contact with the case 10 and the bottom 90 because the holder 70 is held resiliently by the first elastic element 30 and the second elastic elements 80. The movement of the holder 70 is also restricted, so that when the optical element driving mechanism 1 moves or being impacted by the environment, collision between the holder 70 and the case 10 or the bottom 90 does not occur. Therefore, the holder 70 and the optical element 2 therein are not damaged. The first elastic element 30 and the second elastic elements 80 may be made of metal.

The coil 60 surrounds the holder 70 and thus is polygonal. In this embodiment, the coil 60 is octagonal, but this disclosure is not limited thereto. When current is supplied to the driving assembly 40, the magnetic force is generated between the magnetic elements 50 and the coil 60 to drive the holder 70 and the optical element 2 therein to move.

In other embodiments of this disclosure, the movable part P2 further includes a sensed object and a sensor (not shown). The sensed objected is disposed close to the holder 70, and the position of the sensor corresponds to the position of the sensed object. The sensed object may be a magnetic element such as a magnet. The sensor may be a giant magnetoresistive effect sensor (GMR sensor), a tunneling magnetoresistive effect sensor (TMR sensor), etc. When the holder 70 moves, the sensed object near the holder 70 moves as well, and the magnetic field of the sensed object changes. Additionally, the change of the magnetic field of the sensed object is detected by the sensor. Therefore, the position of the holder 70 may be known. Furthermore, position adjustment and displacement control of the holder 70 may be conducted.

Figure 5:
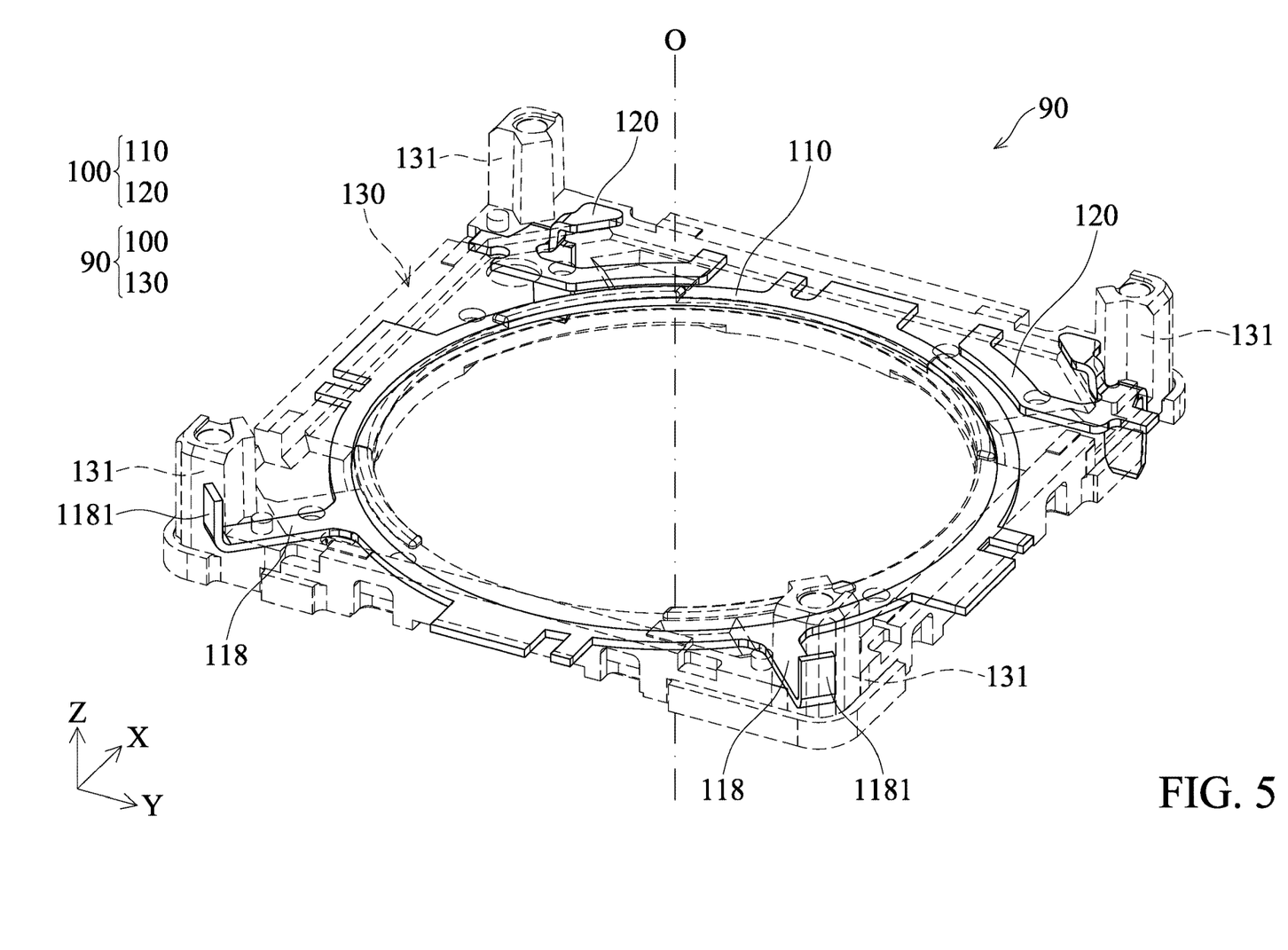
FIG. 5 is a side view of the optical element driving mechanism.

The bottom 90 of the fixed part P1 includes an embedded assembly 100 and a base 130. A portion of the embedded assembly 100 is embedded in the base 130 (as shown in FIG. 5). The embedded assembly 100 includes a strengthening frame 110 and two circuit members 120. The strengthening frame 110 includes a plate structure. The strengthening frame 110 has a perforation 111, and the optical axis O passes through the perforation 111. A portion of the two circuit members 120 are exposed from the base 130. The strengthening frame 110 and the circuit members 120 are not electrically connected. The strengthening frame 110 and the two circuit members 120 may be integrally formed in the same manufacturing process. When viewed along the optical axis O, the strengthening frame 110 does not overlap the circuit members 120. Additionally, the top surface of the strengthening frame 110 and the top surface of the circuit members 120 are located on the same plane. The structural strength of the optical element driving mechanism 1 may be enhanced by the strengthening frame 110.

Figure 3:
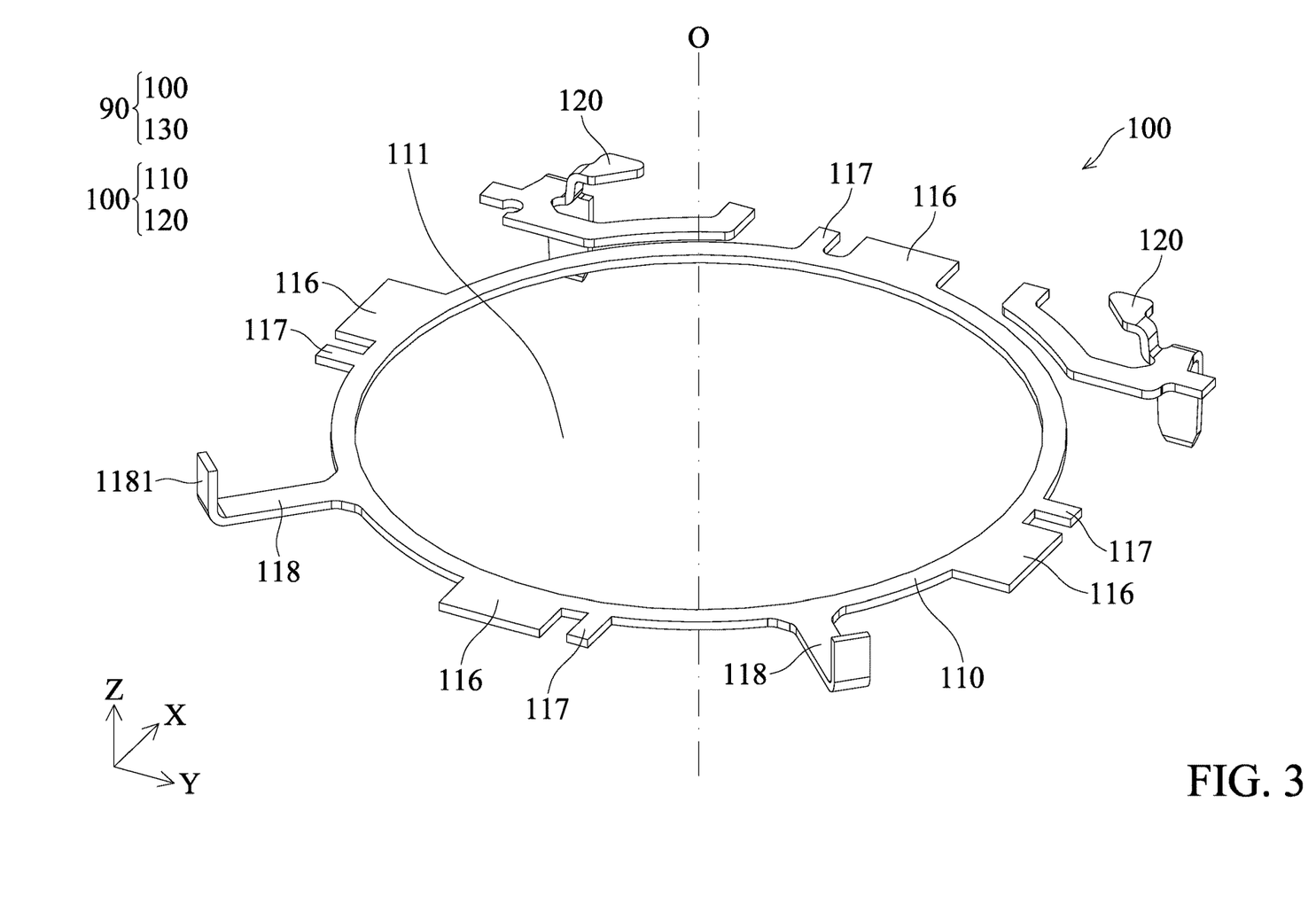
FIG. 3 is a perspective view of an embedded assembly.

FIG. 3 is a perspective view of the embedded assembly 100. The embedded assembly 100 may be made of metal such as phosphor bronze. The embedded assembly 100 may be made of magnetic-permeable material. Magnetic-permeable materials are materials that may be magnetized when a magnetic field is applied, such as ferromagnetic material, steel (e.g. steel plate cold common, SPCC), iron/Ferrum (Fe), Nickel (Ni), Cobalt (Co), alloy, etc.

As shown in FIG. 3, the strengthening frame 110 is a closed structure with ring-shaped. The closed structure may be curved but not break, and the closed structure surround the optical axis O. The closed structure may be circular or rectangular or the like. When the optical element driving mechanism 1 is impacted by a force from the environment, the force may then be distributed by the strengthening frame 110 because of the closed structure. Therefore, not only the structural strength of the bottom 90 is enhanced, but also the ability to resist pressure of the overall optical element driving mechanism 1 is enhanced.

The strengthening frame 110 includes four first protrusions 116, four second protrusions 117, and two third protrusions 118. The four first protrusions 116, the four second protrusions 117, and the two third protrusions 118 all extend from a direction that is away from the optical axis O. The four first protrusions 116 are rotationally symmetric. "Rotationally symmetric" means that an element totally overlaps itself after being rotated 360°/n, wherein n is a positive integer other than for 1. For example, a square is rotationally symmetric. After rotating a square 90° (360°/4), the square totally overlaps itself. Therefore, after rotating the strengthening frame 110 360°/n (wherein n is a positive integer other than 1), the strengthening frame 110 overlaps itself. As shown in FIG. 3, the four first protrusions 116 of the strengthening frame 110 overlap their original profile after being rotated 90°. Furthermore, the second protrusions 117 of the strengthening frame 110 may also be designed to be rotationally symmetric. As shown in FIG. 3, the second protrusions 117 overlap their original profile after being rotated 90° as well. The force from the environment may be further distributed by the feature "rotationally symmetric".

When viewed along the optical axis O, the area of each of the first protrusions 116 is different from the area of each of the second protrusions 117. In this embodiment, the area of each of the first protrusions 116 is greater than the area of each of the second protrusions 117. It is because that the function of the first protrusions 116 and that of the second protrusions 117 are different. The first protrusions 116 correspond to the case 10, and the first protrusions 116 are in contact with or combined with the case 10. The second protrusions 117 are where the strengthening frame 110 is cut. The flatness of the overall strengthening frame 110 may be assured by the second protrusions 117.

Figure 4:
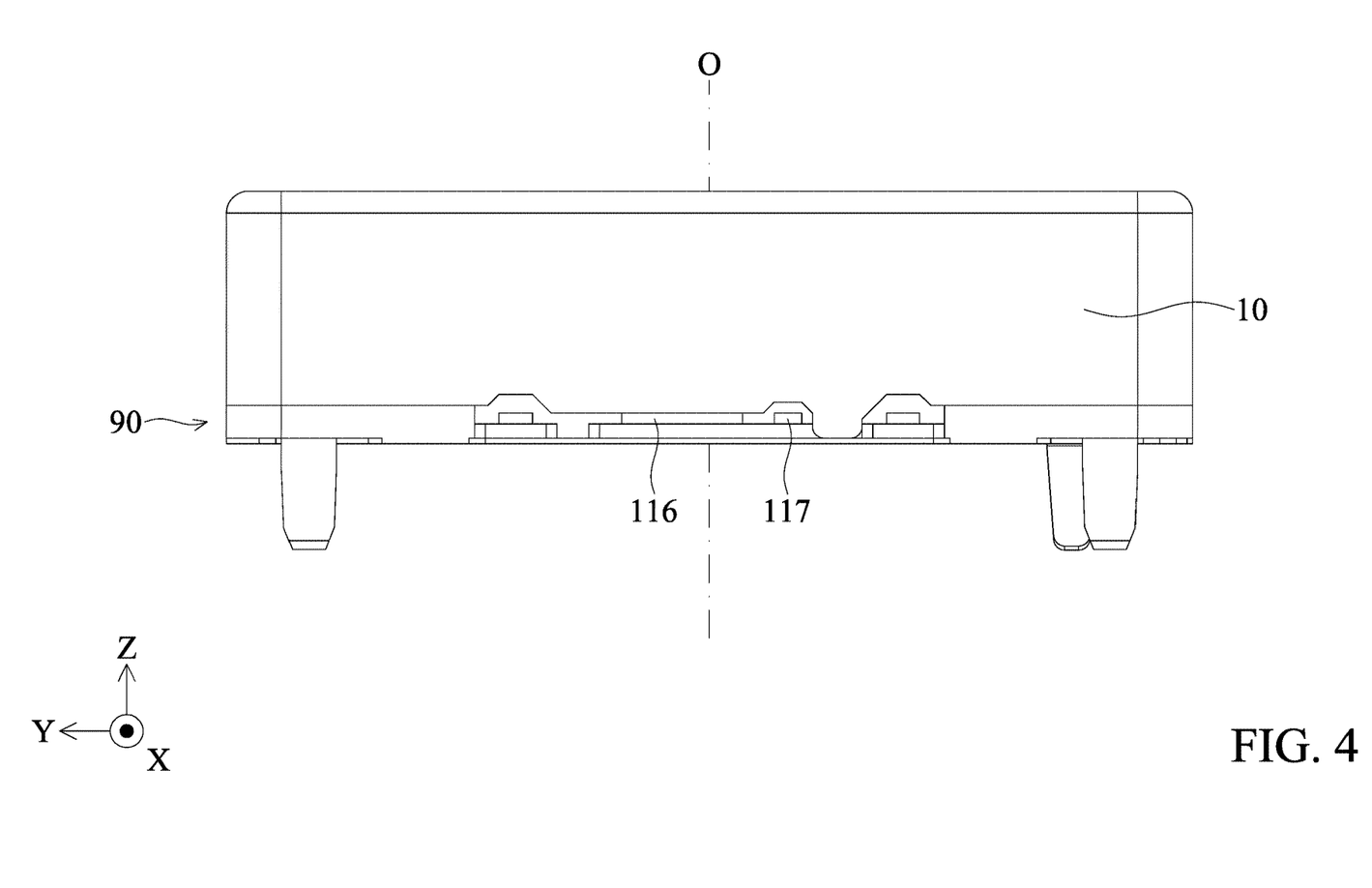
FIG. 4 is a perspective view of a bottom.

FIG. 4 is a side view of the optical element driving mechanism 1. The case 10 is in contact with or connected to the first protrusions 116 of the embedded assembly 100 by welding, fusion, using conductive resin, etc. Therefore, the case 10 and the bottom 90 are connected stably, so that the case 10 is fixedly connected to the bottom 90. Compared to the method of using glue to attach the case 10 to the bottom 90, the optical element driving mechanism 1 is not contaminated when using the aforementioned methods, and thus the cleanliness of the optical element driving mechanism 1 may be maintained.

FIG. 5 is a perspective view of the bottom 90. For clarity of illustration, the base 130 is shown in dotted lines. The two circuit members 120 may be a positive pole and a negative pole, respectively. The two circuit members 120 bend downwardly and protrude from the base 130. The base 130 further includes four pillars 131. The third protrusions 118 include two bending portions 1181 disposed in two of the pillars 131. The number of the bending portions 1181 may be less of more. The bending portions 1181 may be electrically connected to the base 130. Owing to the fact that a portion of the strengthening frame 110 is disposed in the pillars 131, the mechanical strength of the optical element driving mechanism 1 is enhanced, and thus the optical element driving mechanism 1 may bear more impact.

Figure 6:
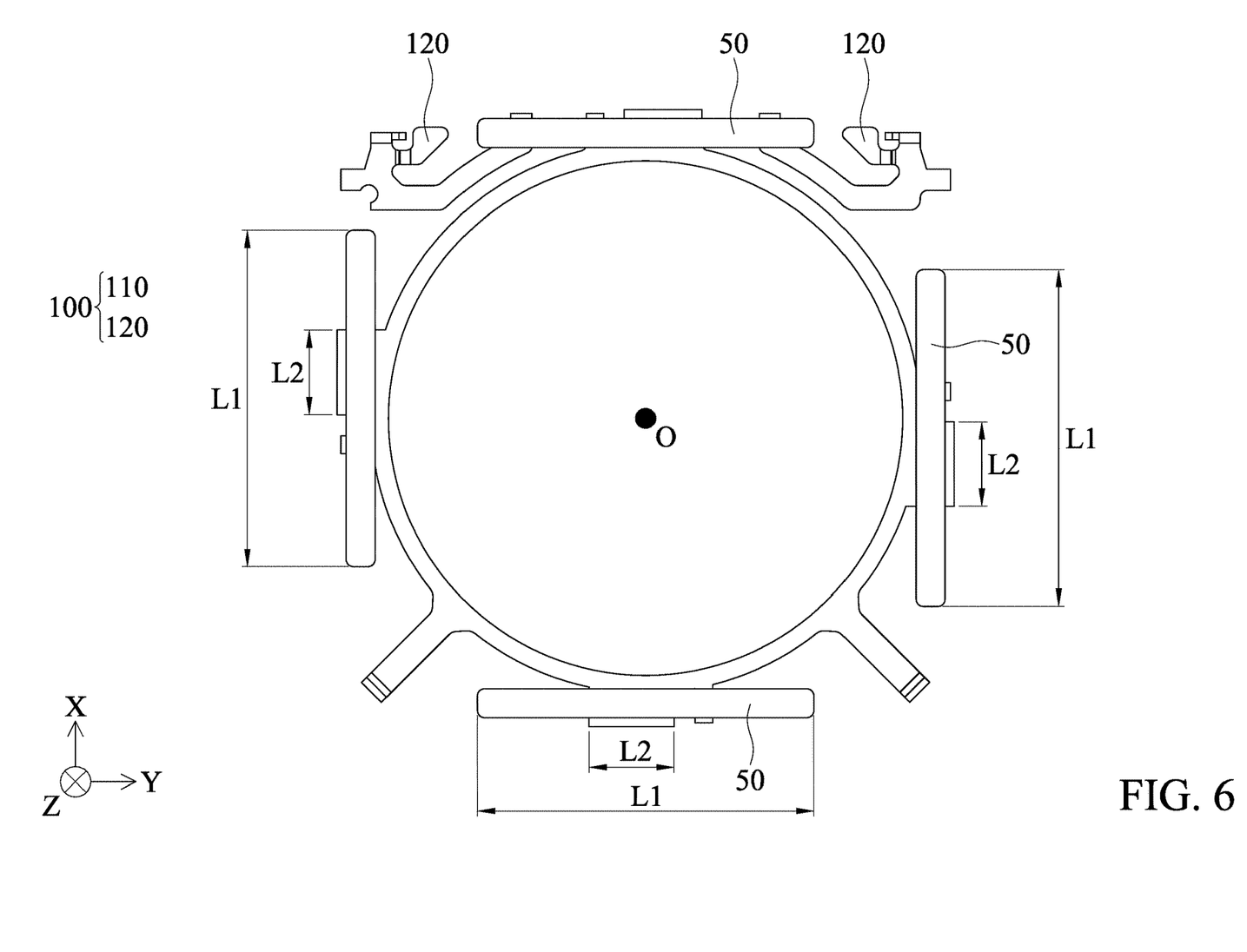
FIG. 6 is a top view of a magnetic element and the embedded assembly.
Figure 7:
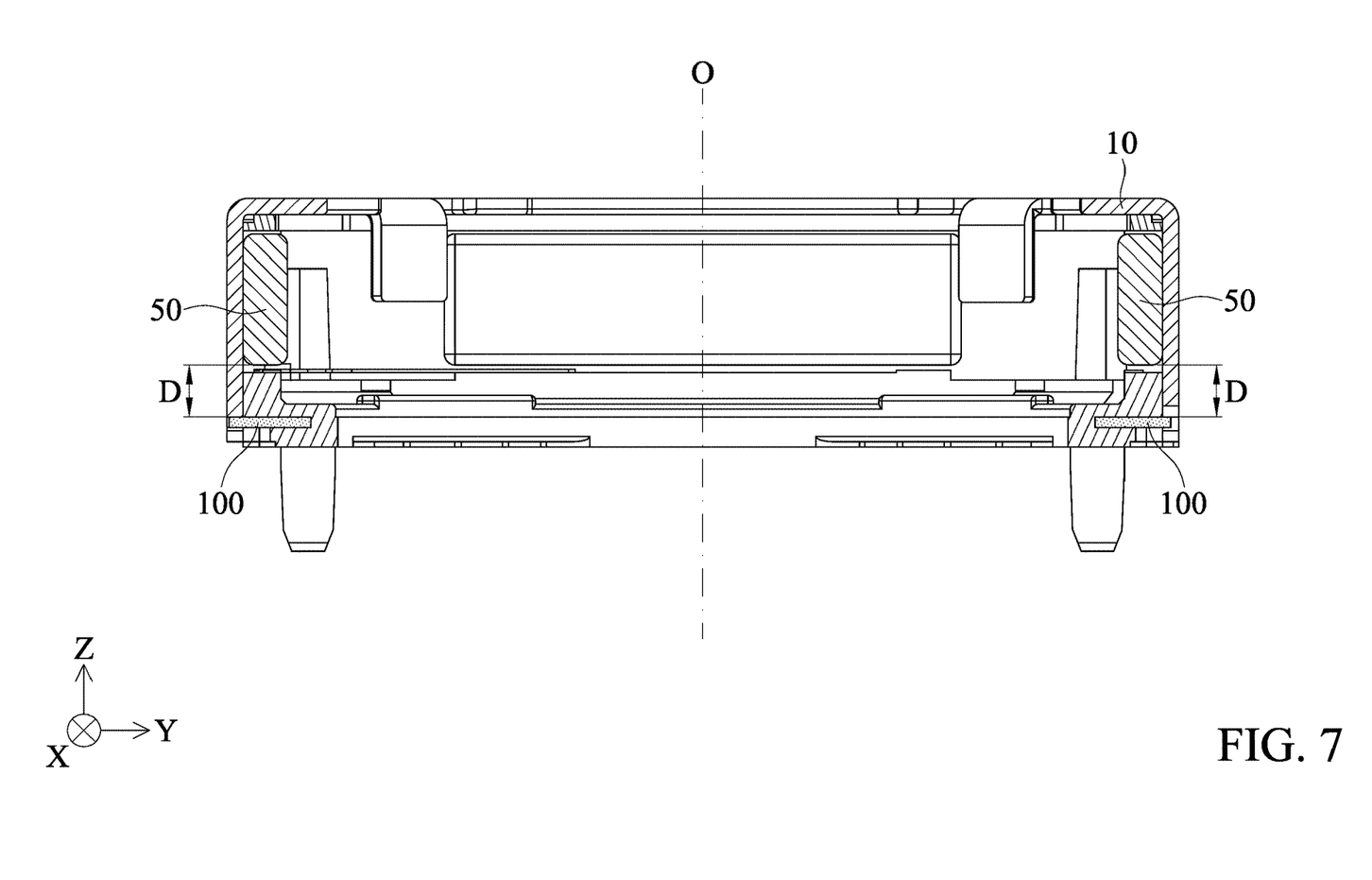
FIG. 7 is a side view of the optical element driving mechanism.

The configuration of the magnetic elements 50 and the embedded assembly 100 are illustrated with reference to FIG. 6 and FIG. 7. FIG. 6 is a top view of the magnetic elements 50 and the embedded assembly 100. FIG. 7 is a side view of the optical element driving mechanism 1. Attractive magnetic force may be generated between the embedded assembly 100 and the magnetic elements 50. The embedded assembly 100 made of magnetic-permeable material may concentrate the generated magnetic force. For example, if the magnetic elements 50 are disposed on the case 10, the attractive magnetic force generated by the magnetic elements 50 located at the case 10 and the embedded assembly 100 located at the bottom 90 may affix the case 10 to the bottom 90, so that the mechanical strength of the fixed part P1 is increased.

Additionally, the length L1 of each of the magnetic elements 50 is generally greater than the length L2 of each of the first protrusions 116. The length L1 of each of the magnetic elements 50 is generally at least five times the length L2 of each of the first protrusions 116 to assure the generated magnetic force is large enough.

In some embodiments, as shown in FIG. 6 and FIG. 7, when viewed along the optical axis O, the magnetic elements 50 partially overlap the embedded assembly 100. Since the magnetic force is inversely proportional to the square of the distance, this configuration may provide a shorter distance between the magnetic elements 50 and the embedded assembly 100 than the circumstances that the magnetic elements 50 do not overlap the embedded assembly 100. As shown in FIG. 7, the distance D between the magnetic elements 50 and the embedded assembly 100 is preferably less than 1.5 mm, so a larger magnetic force may be generated to effectively connect and affix the case 10 to the bottom 90.

It should be noted that if the attractive magnetic force generated by the magnetic elements 50 and the embedded assembly 100 is greater than the weight of the case 10 and the elements disposed on the case 10 or greater than the bottom 90 and the elements disposed on the bottom 90, the case 10 may be more effectively connected to the bottom 90 by such an attractive magnetic force. The case 10 and the bottom 90 may not be separated because of the weight of the elements inside the optical element driving mechanism 1.

For example, the case 10 may be temporarily connected to the bottom 90, which is referred to as "temporary connection". Temporary connection may be conducted before assembly of the optical element driving mechanism 1. The purpose of temporary connection is to test the optical element driving mechanism 1 and to ensure its workability. During the temporary connection, the optical element driving mechanism 1 may be flipped upside down, and other tests may also be conducted. The temporary connection may be achieved by magnetic force, an adhesive, or in a similar manner. Compared to a temporary connection by an adhesive, a temporary connection by magnetic force may simplify the manufacturing process and/or maintain the cleanliness of the optical element driving mechanism 1.

Figure 8:
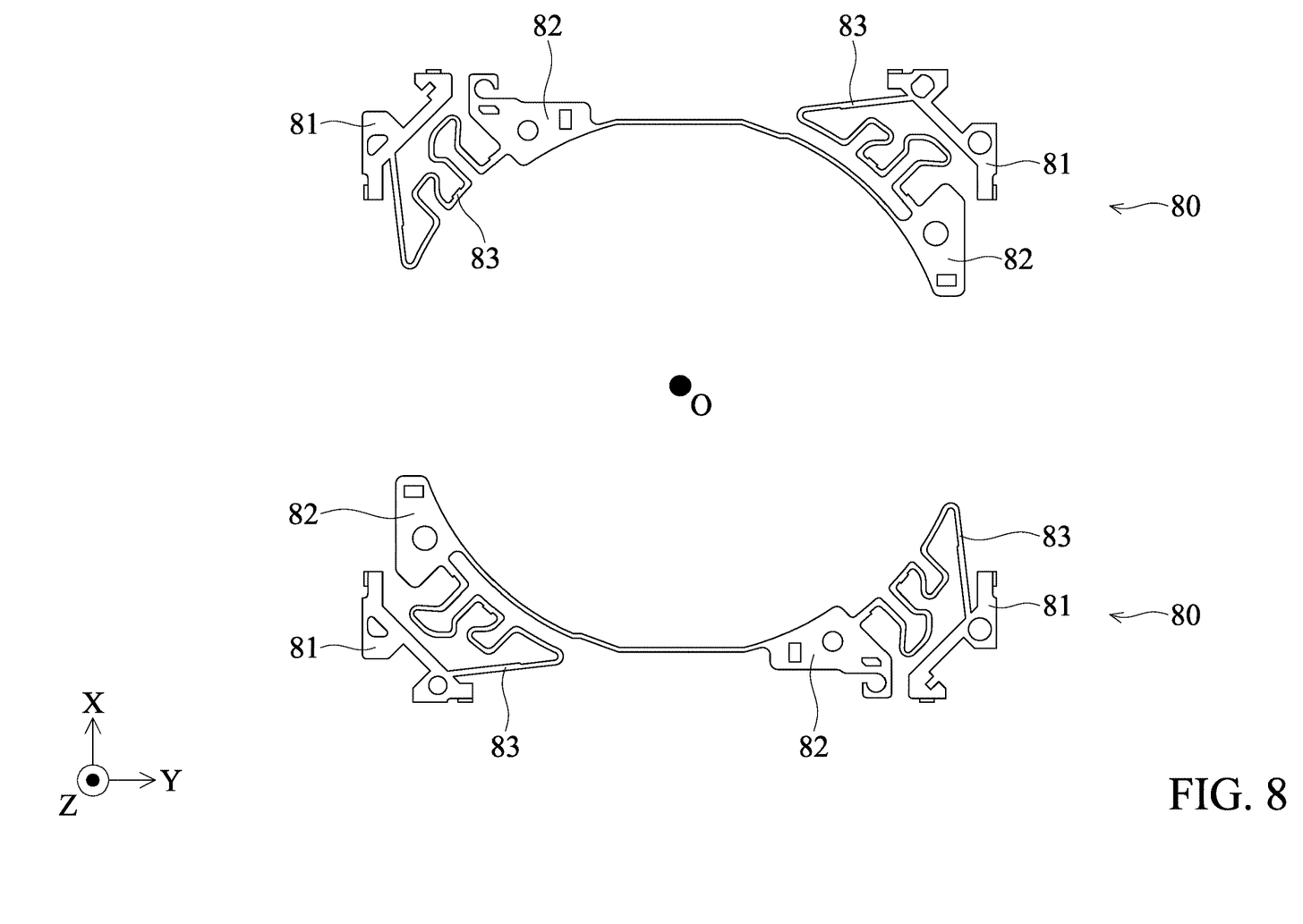
FIG. 8 is a top view of a second elastic element.
Figure 9:
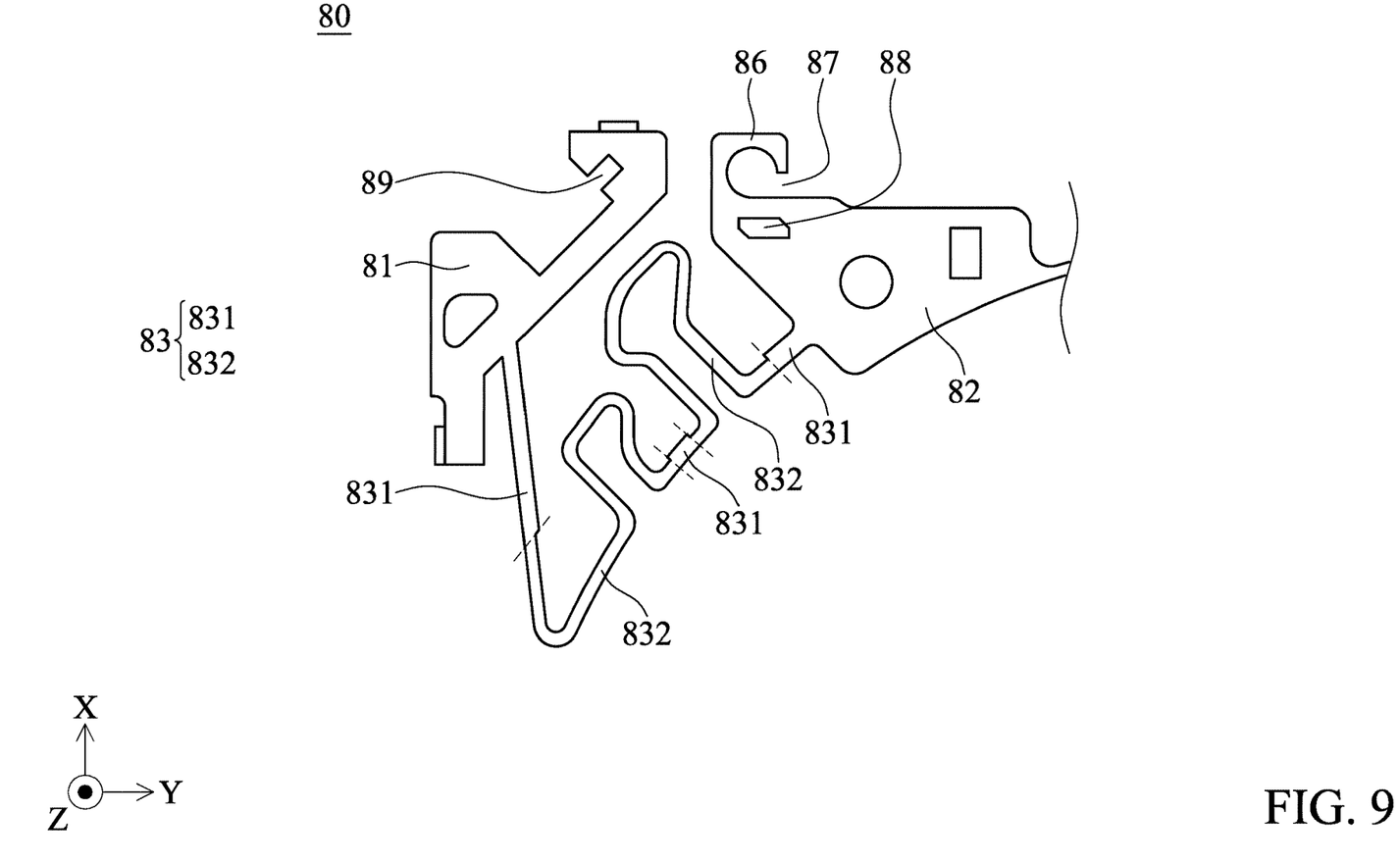
FIG. 9 is a top view of a portion of the second elastic element.

Next, please refer to FIG. 8 and FIG. 9 to understand the structure of the second elastic elements 80. FIG. 8 is a top view of the second elastic elements 80. FIG. 9 is a top view of a portion of the second elastic elements 80. The second elastic elements 80 include a fixed part connection portion 81, a movable part connection portion 82, and a deformation portion 83. The fixed part connection portion 81 is fixedly disposed on the fixed part P1, for example, the fixed part connection portion 81 is fixedly disposed on the bottom 90 of the fixed part P1. The movable part connection portion 82 is fixedly disposed on the movable part P2, for example, the movable part connection portion 82 is disposed on the holder 70 of the movable part P2. The fixed part connection portion 81 and the movable part connection portion 82 are connected via the deformation portion 83. When the fixed part connection portion 81 is connected to the fixed part P1 and the movable part connection portion 82 is connected to the movable part P2, elongation or shrinkage of the deformation portion 83 mainly affects how the second elastic elements 80 work. As described above, the holder 70 is held resiliently by the first elastic element 30 and the second elastic elements 80. Specifically, the deformation portion 83 of the second elastic elements 80 affects how the holder 70 is held.

From Hooke's law, the magnitude of deformation is proportional to the applied force within particular range. The ratio of the applied force to the magnitude of deformation is defined as the elastic coefficient. That is, the elastic coefficient is the force needed for deformation per unit length. If the elastic coefficient is large, the object is less likely to deform. The deformation portion 83 has axial elastic coefficient and lateral elastic coefficient. The axial elastic coefficient is defined as the elastic coefficient along the optical axis O, while the lateral elastic coefficient is defined as the elastic coefficient along a direction that is perpendicular to the optical axis O. In this embodiment, the lateral elastic coefficient is designed to be greater than the axial elastic coefficient, so that the second elastic elements 80 tend to deform in a direction that is parallel to the optical axis O, rather than in a direction that is perpendicular to the optical axis O. Using this design, the fixed part P1 and the movable part P2 may be stably connected to each other, and the second elastic elements 80 do not break easily.

As shown in FIG. 9, the deformation portion 83 includes a first segment 831 and a second segment 832 with different width. For clarity of illustration, the first segment 831 and the second segment 832 are separated by dotted lines. When viewed along the optical axis O, the width of the first segment 831 is greater than that of the second segment 832. By making the first segment 831 wider (including the first segment 831 that is connected to the fixed part connection portion 81, the first segment 831 that is connected to the movable part connection portion 82, and the first segment 831 that is between the second segments 832), the stress may be distributed. Additionally, the portion that may break easily may be strengthened, the lateral elastic coefficient may be increased, and the performance of the optical element driving mechanism 1 may be improved.

Figure 10:
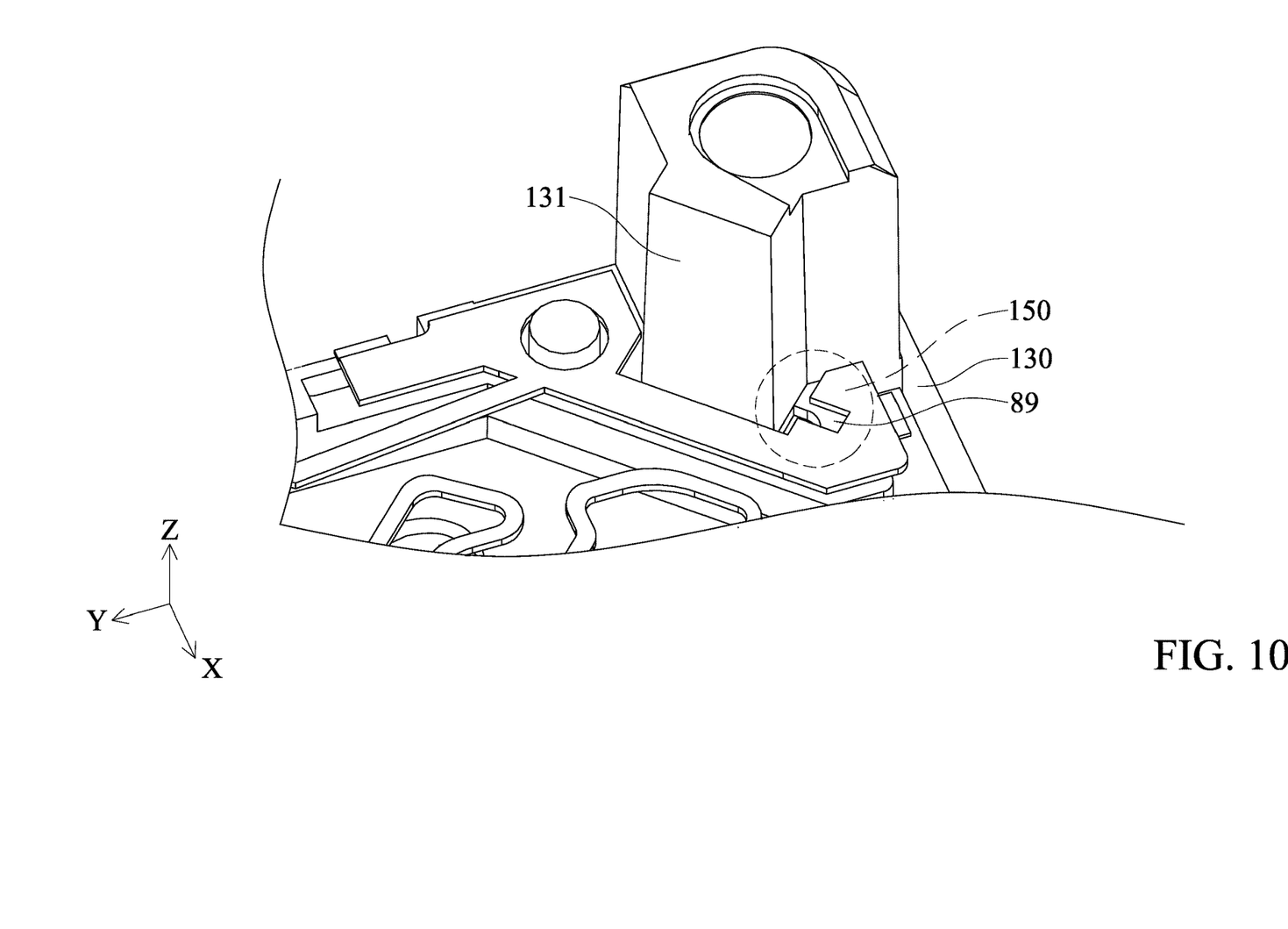
FIG. 10 is a perspective view of the optical element driving mechanism with some elements omitted.

Next, please refer to FIG. 9 and FIG. 10 to understand other features of the second elastic elements 80. FIG. 10 is a perspective view of the optical element driving mechanism 1 with some elements omitted. The second elastic elements 80 are disposed on the base 130 and near the pillars 131. The second elastic elements 80 further include an electrical connection portion 86, a notch 87, a through hole 88, and an opening 89.

An electrical connection element 140 is disposed on the electrical connection portion 86, so that the second elastic elements 80 are electrically connected to the holder 70. The electrical connection element 140 may be made of any material that is suitable for electrical connection. According to some embodiments of this disclosure, if the electrical connection element 140 has a curved surface, then the electrical connection element 140 may be disposed on the second elastic elements 80 more conveniently and precisely. For example, the electrical connection element 140 may be a tin (Sn) ball. During the process of placing the electrical connection element 140, high temperature is usually needed, and the time duration is usually short, for example, less than one second. How the electrical connection element 140 is placed may be observed and/or inspected from the notch 87. Appropriate adjustment to the process may be done according to the observation or inspection.

In this embodiment, the electrical connection portion 86 includes an arc, and the arc is greater than 180 degrees. Since the electrical connection portion 86 includes the arc, the process of placing the electrical connection element 140 may be conducted thoroughly. When the electrical connection element 140 with a curved surface is disposed on the electrical connection portion 86, the curved surface may correspond to the arc of the electrical connection portion 86, so that the arc is thoroughly filled with the electrical connection element 140 without a dead zone. If the electrical connection portion 86 does not include an arc, for example, if the electrical connection portion 86 includes a square, then a portion of the electrical connection portion 86 may not be filled with the electrical connection element 140, such as the corner of the square.

The through hole 88 is close to the electrical connection portion 86. During the process of electrical connection under high temperature, the heat may be concentrated on the electrical connection portion 86 because of the existence of the through hole 88. Therefore, it is advantageous to conduct the process of electrical connection because of the existence of the through hole 88. Additionally, the existence of the through hole 88 may avoid massive heat to be conducted to other portion of the second elastic elements 80, so that the second elastic elements 80 do not deform or break during the process of electrical connection.

The opening 89 faces the pillars 131. An adhesive element 150 is disposed in the opening 89 to attach the opening 89 to the pillars 131. For clarity of illustration, the adhesive element 150 is shown in dotted line. The adhesive element 150 may be made of plastic or a non-conductive material. No other holes or openings on the second elastic elements 80 are needed because the area for adhesion is increased by placing the adhesive element 150 to the opening 89. Therefore, miniaturization of the optical element driving mechanism 1 is achieved.

Figure 11:
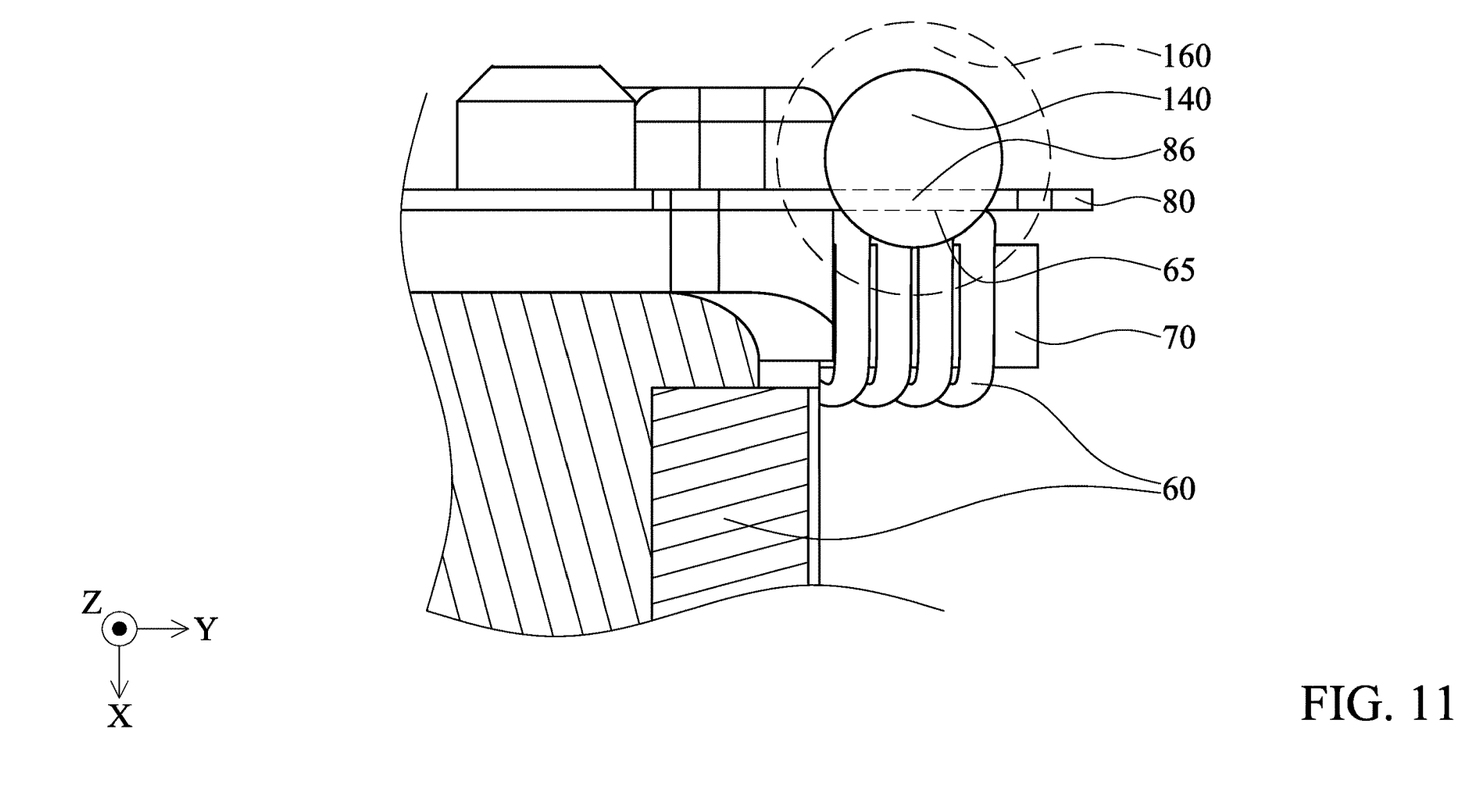
FIG. 11 is a side view of the optical element driving mechanism with some elements omitted.

FIG. 11 is a side view of the optical element driving mechanism 1 with some elements omitted. As shown in FIG. 11, a portion of the coil 60 winds around the holder 70. The coil 60 further includes an electrical contact 65 spaced a distance apart from the electrical connection portion 86. A portion of the electrical connection element 140 is located between the electrical contact 65 and the electrical connection portion 86.

Additionally, as shown in FIG. 11, an adhesive material 160 may be disposed on the electrical connection element 140 and the electrical contact 65. The adhesive material 160 may be any material suitable for adhesion or non-conductive material. By placing the adhesive material 160, the electrical contact 65 may be protected, and the probability of dust entering the optical element driving mechanism 1 is decreased. If the adhesive material 160 is non-conductive, the electrical connection element 140 may be insulated.

Based on the present disclosure, both miniaturization of the optical element driving mechanism and the enhancement of the structural strength of the optical element driving mechanism may be achieved by the embedded assembly. Any force applied to the optical element driving mechanism may be distributed by the special design of the embedded assembly, such as a rotational symmetry or a closed structure. Additionally, the connection of the case and the embedded assembly may simplify the manufacturing process, reduce production cost, and reduce contamination. In addition, the elastic element is specially designed, for example, the connection of the electrical connection element may be improved by the electrical connection portion, the electrical connection element may be observed or inspected from the notch, and unwanted heat being conducted to the elastic element may be prevented by the through hole or the like. Furthermore, the structural strength of the optical element driving mechanism may also be enhanced by an additional adhesive element and/or an adhesive material. It should be noted that the aforementioned embedded assembly and the elastic element may be used together or separately.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism comprising:
   a fixed part comprising a bottom;
   a movable part movable relative to the fixed part and holding an optical element with an optical axis; and
   a driving assembly driving the movable part to move relative to the fixed part,
   wherein the bottom comprises:
      a base; and
      an embedded assembly partially embedded in the base, wherein the embedded assembly comprises a magnetic-permeable material, a strengthening frame, and a circuit member, the strengthening frame comprises a perforation through which the optical axis passes, and when viewed along the optical axis, the strengthening frame does not overlap the circuit member, and
   wherein the strengthening frame and the circuit member are not electrically connected.

2. The optical element driving mechanism as claimed in claim 1, wherein the magnetic-permeable material comprises Fe, Ni, Co, or an alloy thereof.

3. The optical element driving mechanism as claimed in claim 1, wherein the strengthening frame further comprises a closed structure, the closed structure is ring-shaped, and the closed structure surrounds the optical axis.

4. The optical element driving mechanism as claimed in claim 1, wherein the base comprises a pillar, the strengthening frame further comprises a bending portion extending in the optical axis, and the bending portion is embedded in the pillar.

5. The optical element driving mechanism as claimed in claim 1, wherein the strengthening frame comprises a first protrusion and a second protrusion close to the first protrusion, the first protrusion and the second protrusion extend in a direction that is perpendicular to the optical axis, and when viewed along the optical axis, an area of the first protrusion is different from an area of the second protrusion.

6. The optical element driving mechanism as claimed in claim 5, wherein the driving assembly comprises a magnetic element, and when viewed along the optical axis, the magnetic element at least partially overlaps the first protrusion.

7. The optical element driving mechanism as claimed in claim 6, wherein when viewed along the optical axis, a length of the magnetic element is at least five times greater than a length of the first protrusion.

8. The optical element driving mechanism as claimed in claim 1, wherein the strengthening frame further comprises a plurality of first protrusions that are rotationally symmetric.

9. The optical element driving mechanism as claimed in claim 1, wherein the embedded assembly comprises two circuit members, and when viewed along the optical axis, the two circuit members are located on two adjacent corners of the optical element driving mechanism.

10. The optical element driving mechanism as claimed in claim 1, further comprising an elastic element between the movable part and the bottom, wherein the elastic element comprises an electrical connection portion, and the electrical connection portion comprises an arc that is greater than 180 degrees.

11. The optical element driving mechanism as claimed in claim 10, wherein the elastic element further comprises a notch and a through hole, and the notch is closer to the electrical connection portion than the through hole.

12. The optical element driving mechanism as claimed in claim 10, further comprising an electrical connection element disposed on the electrical connection portion, wherein the electrical connection element comprises a curved surface corresponding to the arc.

13. The optical element driving mechanism as claimed in claim 12, further comprising an adhesive element disposed on the electrical connection element.

14. The optical element driving mechanism as claimed in claim 12, wherein the driving assembly further comprises an electrical contact spaced a distance apart from the electrical connection portion, and a portion of the electrical connection element is located between the electrical contact and the electrical connection portion.

15. The optical element driving mechanism as claimed in claim 10, wherein the elastic element further comprises a deformation portion with a first segment and a second segment, and when viewed along the optical axis, a width of the first segment is greater than a width of the second segment.

16. The optical element driving mechanism as claimed in claim 1, further comprising an elastic element located between the movable part and the bottom, wherein the bottom comprises a pillar, and the elastic element comprises an opening facing the pillar.

17. The optical element driving mechanism as claimed in claim 16, further comprising an adhesive element disposed in the opening to connect the elastic element to the bottom.

18. An optical element driving mechanism comprising:
a fixed part comprising a bottom;
a movable part movable relative to the fixed part and holding an optical element with an optical axis; and
a driving assembly driving the movable part to move relative to the fixed part,
wherein the bottom comprises:
a base; and
an embedded assembly partially embedded in the base, wherein the embedded assembly comprises a magnetic-permeable material and a strengthening frame, and the strengthening frame comprises a perforation through which the optical axis passes and a bending portion extending in the optical axis, and
wherein the base comprises a pillar, and the bending portion is embedded in the pillar.

19. An optical element driving mechanism comprising:
a fixed part comprising a bottom;
a movable part movable relative to the fixed part and holding an optical element with an optical axis; and
a driving assembly driving the movable part to move relative to the fixed part,
wherein the bottom comprises:
a base; and
an embedded assembly partially embedded in the base, wherein the embedded assembly comprises a magnetic-permeable material and a strengthening frame, and the strengthening frame comprises a perforation through which the optical axis passes, and
wherein the strengthening frame further comprises a first protrusion and a second protrusion close to the first protrusion, the first protrusion and the second protrusion extend in a direction that is perpendicular to the optical axis, and when viewed along the optical axis, an area of the first protrusion is different from an area of the second protrusion.

20. An optical element driving mechanism comprising:
a fixed part comprising a bottom;
a movable part movable relative to the fixed part and holding an optical element with an optical axis;
a driving assembly driving the movable part to move relative to the fixed part;
an elastic element between the movable part and the bottom, wherein the elastic element comprises an electrical connection portion, and the electrical connection portion comprises an arc that is greater than 180 degrees; and
an electrical connection element disposed on the electrical connection portion, wherein the electrical connection element comprises a curved surface corresponding to the arc,
wherein the bottom comprises:
a base; and
an embedded assembly partially embedded in the base, wherein the embedded assembly comprises a magnetic-permeable material, and
wherein the driving assembly further comprises an electrical contact spaced a distance apart from the electrical connection portion, and a portion of the electrical connection element is located between the electrical contact and the electrical connection portion.

21. An optical element driving mechanism comprising:
a fixed part comprising a bottom;
a movable part movable relative to the fixed part and holding an optical element with an optical axis;
a driving assembly driving the movable part to move relative to the fixed part; and
an elastic element between the movable part and the bottom, wherein the elastic element comprises an electrical connection portion, and the electrical connection portion comprises an arc that is greater than 180 degrees,
wherein the bottom comprises:
a base; and
an embedded assembly partially embedded in the base, wherein the embedded assembly comprises a magnetic-permeable material, and
wherein the elastic element further comprises a deformation portion comprising a first segment and a second segment, and when viewed along the optical axis, a width of the first segment is greater than a width of the second segment.

22. An optical element driving mechanism comprising:
a fixed part comprising a bottom, wherein the bottom comprises a pillar;
a movable part movable relative to the fixed part and holding an optical element with an optical axis;
a driving assembly driving the movable part to move relative to the fixed part;
an elastic element located between the movable part and the bottom, wherein the elastic element comprises an opening facing the pillar; and
an adhesive element disposed in the opening to connect the elastic element to the bottom,
wherein the bottom comprises:
a base; and
an embedded assembly partially embedded in the base, wherein the embedded assembly comprises a magnetic-permeable material.

* * * * *